N. FURDUY.
CONNECTING DEVICE.
APPLICATION FILED JULY 14, 1917.

1,265,646.

Patented May 7, 1918.

Witnesses
H. Harwood.
C. R. Ziegler.

Inventor
Nicholas Furduy.
By Joshua R. H. Potts.
His Attorney

UNITED STATES PATENT OFFICE.

NICHOLAS FURDUY, OF PHILADELPHIA, PENNSYLVANIA.

CONNECTING DEVICE.

1,265,646.	Specification of Letters Patent.	Patented May 7, 1918.

Application filed July 14, 1917. Serial No. 180,628.

*To all whom it may concern:*

Be it known that I, NICHOLAS FURDUY, a citizen of the United States, residing at Philadelphia, in the county of Philadelphia and State of Pennsylvania, have invented certain new and useful Improvements in Connecting Devices, of which the following is a specification.

My invention consists of an improved connecting device, and is particularly adapted for use on flexible hose. One object of my invention is to provide a device which can be used for connecting the end of a hose to a valve or coupling member.

Another object is to so construct my invention that it can be quickly and easily attached to a hose and will not become loose during the use of the hose.

A further object is to make my improved connecting device of simple and durable construction and so that it can be manufactured and sold at a low cost.

These objects, and other advantageous ends which will be described hereinafter, I attain in the following manner, reference being had to the accompanying drawings in which—

Figure 1:
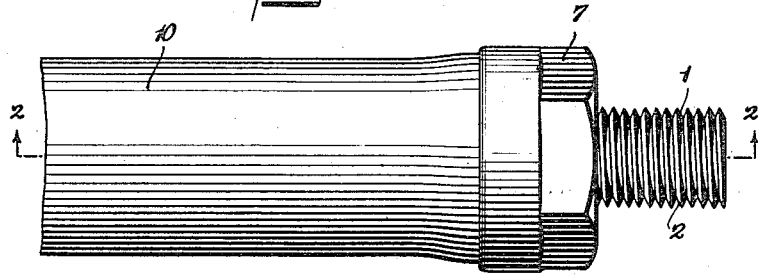
Figure 1 is an outside view of the end of the hose having my improved connecting device attached thereto.

Referring to the drawing, 1 is a tube preferably made of metal and at one end is provided with external screw-threads 2. A collar 3 is internally screw-threaded and adapted to be screwed on the threads 2 of the tube 1. This collar is preferably made of metal and has a flared or cam surface 4 which extends from one end.

The external diameter of the tube 1 is substantially the same as the diameter of said end of the collar from which the flared portion 4 begins. The opposite end 5 of the collar 3 extends substantially at right angles to its longitudinal axis and is preferably rounded as shown at 6 at its intersection with the flared portion 4 so that there are no sharp corners projecting from the collar 3.

A nut 7 is designed to be screwed upon the threaded end of the tube 1 and has a recess 8 extending inwardly from one end, this recess tapering from said latter mentioned end for a portion of its depth and terminating in a curved surface 9 which leads to the tube 1.

Figure 2:
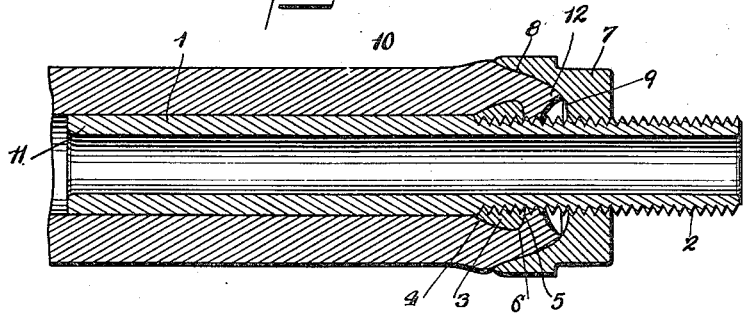
Fig. 2 is a section on the line 2—2 of Fig. 1.

The recess 8 at its widest portion is preferably made slightly greater in diameter than the exterior diameter of the hose 10 to which the device is attached so that the extreme end portion of the hose can be extended within the recess as clearly shown in Fig. 2, the tube 1 and collar 3 being positioned within the hose so that only a portion of the threaded end 2 of the tube projects out of the end of the hose.

When it is desired to attach my invention to a hose, the smooth end 11 of the tube 1 is pushed within the hose, sufficient force being applied to spread the hose sufficiently to permit the collar 3 to be pushed slightly beyond the end of the hose. This can easily be done for the reason that the tapered portion 4 of the collar will gradually spread the end of the hose to permit the widest portion of the collar to pass therein. The nut 7 is then screwed on the threaded end 2 of the tube 1 until the extreme end 12 of the hose engages the inner surface of the recess, and as the latter tapers to a diameter smaller than the normal exterior diameter of the hose, the end of the hose will be compressed and will bend around the end portion 5 of the collar 3, thereby preventing relative longitudinal movement between the hose and the tube.

The farther the nut 7 is screwed on the tube 1, the more the end 12 of the hose will be compressed, since as above stated the curved surface 9 of the recess directly intersects the tube 1, so that it is possible to compress the hose until the interior surface of the hose engages the screw-threads of the tube 1, thus forming a complete seal against leakage of any fluid passing through the hose and tube 1.

Figure 3:
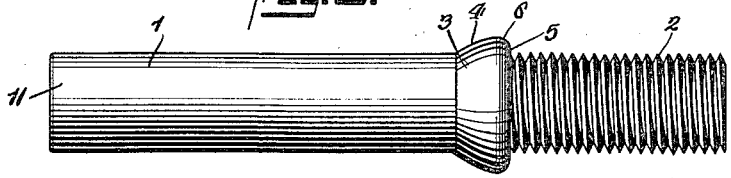
Fig. 3 is an outside view of a tube and separate collar which form a part of my invention.
Figure 4:
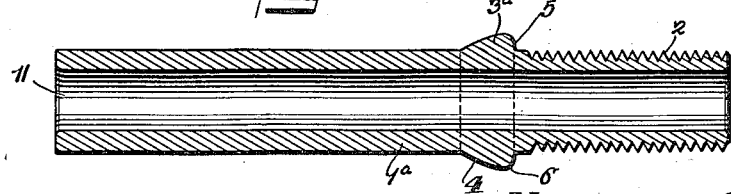
Fig. 4 is a longitudinal section of a modified form of the tube shown in Fig. 3 and in which the collar is made integral therewith.

If desired, the collar 3 can be soldered to the tube or as shown in Fig. 4, the collar 3ª can be made integral with the tube 1ª. In all other respects Fig. 4 is similar to the construction shown in Figs. 1 to 3 inclusive, and I have therefore given similar parts corresponding reference numerals.

The screw-threaded portion 2 of the tube is made sufficiently long that after the device has been attached to the hose, a portion of the threaded end of the tube will project beyond the nut and this portion can be utilized to secure the hose to any coupling device desired.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claim.

Having thus described my invention, what I claim as new and desire to secure by Letters Patent is:

A connecting device for hose including a tube having a threaded portion and a collar located within its length, a portion of said tube including the collar being designed to be pushed within a hose until the hose end overlies the collar, and a member designed to be screwed on said threaded portion of the tube and having a recess designed to surround the collar so that the surface which forms said recess compresses the end of the hose against the collar, said collar flaring from its inner end and having an outer end surface extending substantially at right angles to its longitudinal axis, said threaded portion being adapted to extend beyond the hose for attachment to some coöperating member.

In testimony whereof I have signed my name to this specification in the presence of two subscribing witnesses.

NICHOLAS FURDUY.

Witnesses:
MARY A. INGLAR,
CHAS. E. POTTS.